2,928,792
Patented Mar. 15, 1960

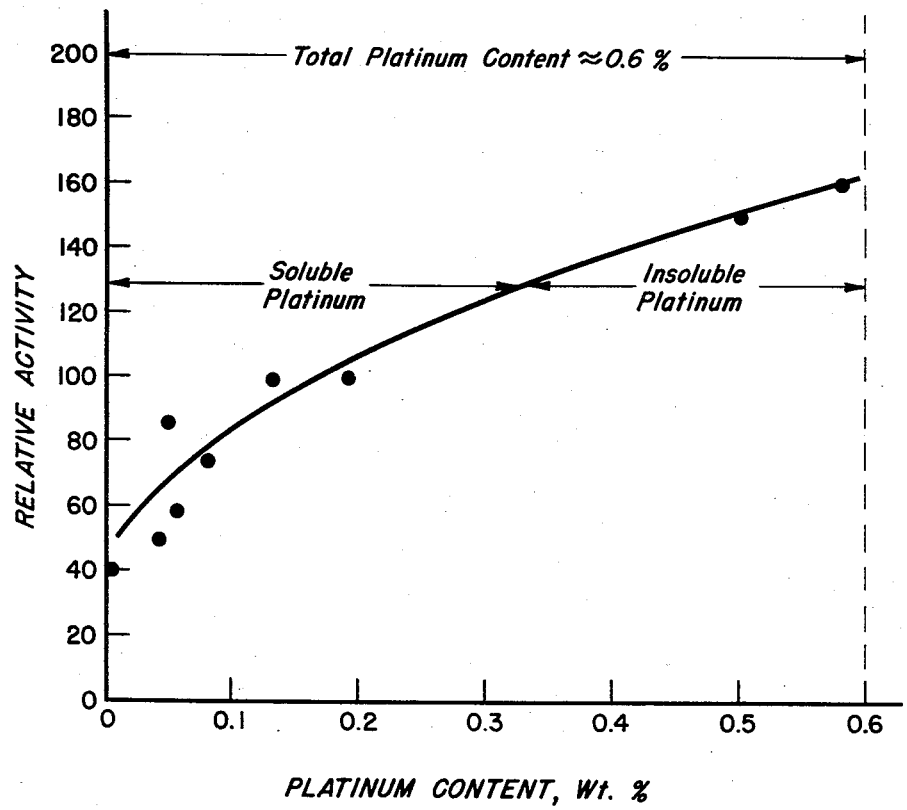

United States Patent Office 2,928,792

ACTIVITY OF PLATINUM-ALUMINA CATALYST

Ralph J. Bertolacini, Chesterton, Ind., assignor to Standard Oil Company, Chicago, Ill., a corporation of Indiana Application December 16, 1957, Serial No. 702,914

8 Claims. (Cl. 252—441)

This invention relates to platinum-alumina catalyst activity and more specifically to a simplified and inexpensive technique for determining the hydrocarbon conversion activity of platinum-halogen-alumina composites.

Research, development and hydrocarbon conversion operations involving use of platinum-alumina composites necessitate numerous and frequent determinations of catalyst activity. Such catalysts usually comprise about .01 to 2 weight percent platinum and about .05 to 5 weight percent halogen, usually fluoride or chloride, supported on some form of alumina-containing base, usually a gamma, eta, theta, and/or chi-type alumina (see "Alumina Properties," Technical Paper No. 1, revised by Russell et al., copyright 1956, Aluminum Company of America). Preparation of such composites is described, for example, in Heard et al. U.S. Patent 2,659,701, patented November 17, 1953.

Hydrocarbon conversion activity, however, it not a mere direct function of the platinum and/or halogen content. For example, one catalyst may contain the same platinum and/or halogen content as well as the same type of alumina as another catalyst but still may have a vastly-different activity. Thus, to ascertain activity, it has heretofore been necessary to conduct pilot-plant tests of the catalyst under conditions substantially simulating those of actual hydrocarbon conversion operations. Unfortunately, such tests are quite costly, often require a substantial quantity of catalyst, and are often too time-consuming and cumbersome to be an effective tool for process control.

An object of the present invention therefore is to provide a simple, inexpensive, and quick method for determining the hydrocarbon conversion activity of platinum-halogen-alumina composites. Another object is to provide a measure of the hydrocarbon conversion activity, particularly dehydrocyclization activity, of platinum-halogen-alumina catalysts without having to resort to testing under actual process conditions. Another object is to provide a method of measuring platinum-halogen-alumina activity which doesn't require a substantial quantity (more than 5–10 grams) of the composite. A still further object is to provide a method of preparing a highly-active platinum-halogen-alumina catalyst which maximizes activity per unit of platinum. These and other objects of the present invention will become apparent as the description thereof proceeds.

It has now been discovered that, in accordance with the present invention, activity of a given platinum-halogen-alumina composite varies with the amount of hydrofluoric-acid-soluble platinum contained therein, as determined as hereinafter described. Thus, for example, the effect of a given treatment on activity can be readily determined without expensive pilot-plant tests by determining the effect on the soluble platinum content. In practicing my invention, I determine activity by contacting the platinum-halogen-alumina composite with an excess of hydrofluoric acid so as to react, dissolve, or otherwise bring into solution substantially completely all of the alumina in the composite. The platinum which also appears in the resulting solution, hereinafter referred to as soluble or active platinum, can be directly related to hydroforming activity of the catalyst, as will be fully illustrated hereinafter, whereas the platinum remaining in the residue, that is, the hydrofluoric-acid-insoluble platinum appears to contribute relatively little to activity.

In practicing my invention I prefer to use a solution containing at least about 5 weight percent of hydrogen fluoride, preferably about 30–60 percent hydrogen fluoride, for example, 48 percent hydrogen fluoride. An "excess" of the hydrofluoric acid must be present to insure reaction of substantially all of the alumina. It has been found that when substantially all of the alumina is reacted or otherwise brought into the solution, substantially all of the soluble or active platinum is also brought into the solution. "Excess" for purposes of this invention, therefore, means at least that volume of hydrofluoric acid solution that will envelope the sample and will also supply fluoride ions in sufficient quantity to react with all of the alumina present. A quantity substantially greater than such minimum is normally preferred, except, possibly, when the resulting solution may be used in the preparation of a catalytic composite, as further described hereinafter.

Once the alumina, and therefore active platinum, has been brought into the solution, the amount of active platinum may then be determined by any convenient means known to the art (for example, see Ayres, G., and Meyers, A., Anal, Chem. 23, 299, 1951; or Sandell, E. B., "Colorimetric Determination of Traces of Metals," p. 358, Interscience, New York, 1944). In one such method, in brief, the solution is steamed to remove excess hydrofluoric acid, then dissolved in aqua regia, following which platinum therein is converted to chloroplatinic acid by repeated drying of the solution to wet salts and then taking them up in HCl. A reducing agent, e.g., formic acid, is then added to convert nitrates to oxides of nitrogen which are removed as gases. A 20 percent solution of stannous chloride is then added to the chloroplatinic acid to develop color for differential color determination, using, for example, a Beckman DU Spectrophotometer (Beckman Instruments, Inc.) at 403 millimicrons wave length.

As an alternative to determining the amount of soluble platinum directly, such determination may be indirectly computed from the insoluble platinum in the residue if the total platinum content of the catalyst is already known. Thus, soluble platinum is the difference between the total platinum content and the insoluble platinum content. Total platinum content of the composite and insoluble platinum content of the residue may be determined by any means of the prior art, such as described above in connection with soluble platinum content. Thus, the platinum in the residue may be dissolved in aqua regia and then converted to chloroplatinic acid for differential color determination as above. Since the total platinum content is usually already determined as a matter of routine, I have found it convenient in practice to compute soluble platinum by measuring hydrofluoric-acid-insoluble platinum in the residue and subtracting from total platinum. Measuring insoluble platinum in the residue is more convenient because gross amounts of alumina are not present, as is the case with soluble platinum. To check results, however, I usually prefer to measure both soluble and insoluble platinum to make sure all platinum is accounted for.

In another embodiment of my invention, I take advantage of the fact that only active platinum is dissolved with the alumina in the hydrofluoric acid. I use the resultant solution to prepare a platinum catalyst of exceptionally high activity per unit of platinum. This may be done, for example, by drying down the solution and calcining the resulting composite. Where the original platinum-halogen-alumina catalyst may have become contaminated by formation of inactive alpha-type alumina, this embodiment has the additional advantage of providing a means of minimizing or substantially eliminating such alpha alumina from the final catalyst. Thus, the HF solution of my invention preferentially dissolves only the active form of platinum and only the active forms of alumina, leaving relatively inactive platinum and alpha alumina in the residue.

As an alternate to drying down the solution, the solution may be cogelled with another support, such as a silica, zirconia, or alumina hydrosol, or mixtures thereof. Likewise the solution may be used to impregnate a solid support, such as alumina, zirconia, chromia, and the like, and mixtures thereof. In such cases, excess HF solution should be avoided to minimize unnecessary further reactions and also to avoid excess fluoride content. Where it is desirable to minimize otherwise control fluoride content, I have found it convenient to do so by addition of silica to the solution, thereby eliminating fluoride as gaseous silicon tetrafluoride. Silica itself can also be impregnated with the solution by sufficient dilution thereof.

Drying and calcining of the solution and of the cogelled or impregnated material may be carried out under conventional conditions, for example, drying at 100 to 400° F. for 1 to 24 hours and calcining at 600–1200° F. for 1 to 24 hours. Drying and calcining may, of course, be carried out as one continuous step. The final catalyst may be prepared, of course, in any desired physical configuration, such as, a powder, pills, pellets, and the like, by means well known to the art. The resulting catalytic composite is highly efficient per unit of platinum because substantially all of the platinum is in the form of soluble or active platinum.

When determining catalyst activity I prefer to finely divide and pre-wet the composite before adding hydrofluoric acid. The composite is usually finely divided to pass at least a 20 mesh ASTM sieve, preferably at least about 90 percent passing through a 60 mesh ASTM sieve (ASTM Designation E11–39, 1949). Any technique of the prior art, e.g., crushing, grinding, etc., is suitable for preparing the composite in finely-divided form. To pre-wet the composite, normally about 0.5 to 20 milliliters of water per gram of the composite are used, e.g., about 4 milliliters per gram. Pre-wetting serves to prevent excessive temperature rise resulting from the exothermic reaction when hydrofluoric acid is added to the alumina composite. Overheating is also retarded by surrounding the vessel containing the finely-divided and pre-wetted composite with cold water. The vessel itself must, of course, be inert to hydrofluoric acid, and I therefore prefer to use a beaker and stirrer made of high-melting-point polyethylene. Even with such cooling, however, the reaction usually proceeds at or close to the boiling point of the hydrofluoric acid solution. While the reaction is normally carried out at atmospheric pressure, higher or lower pressures may also be utilized. Usually the reaction, that is, the dissolving of the alumina and soluble platinum, is completed in less than one hour after adding hydrofluoric acid and may take as little as one minute, although about 5 minutes is more typical.

The invention will be more fully understood from the following specific examples, which may be read in conjunction with the accompanying figure which forms a part of the specification.

Examples—Series 1

A series of tests were made to determine the soluble and insoluble platinum contents of platinum-halogen-alumina composites prepared by three different techniques. Each composite contained or was adjusted to platinum levels of about 0.6 weight percent and halogen levels of about 0.4–0.6 weight percent. Actual pilot-plant activity determinations were also made of these composites and the relationship between soluble platinum and activity plotted as shown in the accompanying figure.

All three catalysts were prepared from a Heard-type alumina hydrosol (Heard Re. 22,196, October 6, 1942). Catalyst A (containing 0.588 percent total platinum) was prepared by cogelling a sulfided chloroplatinic acid solution with the alumina hydrosol and drying and calcining. Catalyst B (containing 0.572 percent total platinum) was prepared by ammonia aging the alumina hydrosol at a pH above about 8.5 for a period above about one hour, drying the resulting ammonia-aged precipitated alumina to a volatiles content below about 50 percent, impregnating the alumina with sulfided chloroplatinic acid, drying and calcining. Catalyst C (containing about 0.58–0.60 percent total platinum) was prepared by gelling, drying, and calcining the alumina hydrosol and then impregnating the calcined alumina with a solution of chloroplatinic acid and aluminum chloride, and then drying and calcining. In each case the catalyst was prepared in the form of pellets by conventional techniques. Each of the three catalysts was tested as freshly prepared. In addition, separate aliquot samples of Catalyst A were tested after being heat treated under a variety of conditions, further described hereinafter.

To obtain the soluble and insoluble platinum content, each composite was ground to pass a 60 mesh ASTM sieve. A 5-gram sample of the finely-divided composite was then placed in a polyethylene beaker and pre-wet by addition of 20 milliliters of distilled water. The beaker was immersed in cold water, and 20 milliliters of an aqueous solution of 48 weight percent hydrogen fluoride was added. Contents of the beaker were stirred by means of a polyethylene stirring rod until the reaction was complete and all of the alumina was taken into solution. In all cases the alumina was completely dissolved in less than about 5 minutes after adding the hydrofluoric acid. Contents of the beaker were then filtered (Whatman No. 42 filter paper), and both the resulting filtrate and residue were analyzed for platinum content by a stannous chloride colorimetric technique, such as described hereinabove.

An aliquot sample of each of the composites, in the form of ⅛″ by ⅛″ pellets, was also tested in a 50-cc. hydroforming pilot-plant using a Mid-Continent naphtha having the following inspections:

| | |
|---|---|
| Gravity, ° API | 55.3 |
| ASTM distillation, ° F.: | |
| IBP | 188 |
| 10 | 230 |
| 30 | 249 |
| 50 | 273 |
| 70 | 293 |
| 90 | 322 |
| Max. | 381 |
| RVP, lbs. | 1.4 |
| Type analysis, vol. percent: | |
| Paraffins | 51.0 |
| Olefins | 0.5 |
| Naphthenes | 41.5 |
| Aromatics | 7.0 |

Reforming conditions were a block temperature of 930° F., a pressure of 200 p.s.i.g., a weight-hourly space velocity of 2, and a once-through hydrogen rate of 5000 standard cubic feet per barrel of naphtha. From the resulting reformate product inspections and the test conditions, catalyst activity, i.e., relative activity, was calculated as the relative quantity, expressed as a percentage, of an arbitrarily-chosen standard reference catalyst required to produce a $C_5+$ reformate fraction having the same octane number under the same test conditions.

Results of the soluble and insoluble platinum content determinations and the catalyst activity tests are summarized in the following table:

| | Weight Percent Platinum | | | Relative Activity 0-20 Hrs. |
|---|---|---|---|---|
| | Soluble | Insoluble | Sum | |
| Catalyst A: | | | | |
| Fresh | 0.193 | 0.395 | 0.588 | 100 |
| Heated in H₂, 1,300° F., 16 hr. | 0.005 | 0.596 | 0.601 | 40 |
| Heated in H₂, 950° F., 16 hr. | 0.057 | 0.520 | 0.577 | 58 |
| Heated in N₂—H₂, 825-930° F., 6 hr. | 0.134 | 0.454 | 0.588 | 99 |
| Heated in Air, 1,300° F., 16 hr. | 0.051 | 0.530 | 0.581 | 85 |
| Heated in Vacuum, 1,300° F., 16 hr. | 0.081 | 0.508 | 0.589 | 74 |
| Heated in CH₄, 950° F., 16 hr. | 0.044 | 0.550 | 0.594 | 50 |
| Catalyst B: Fresh | 0.503 | 0.068 | 0.571 | 150 |
| Catalyst C: Fresh | 0.582 | 0.0 | 0.582 | 160 |

Soluble platinum contents are plotted as a function of relative activity in the accompanying figure. For convenient presentation, total platinum content for all composites is represented as approximately 0.6 weight percent although, as indicated above, total platinum ranges from about 0.57 to about 0.60 weight percent. The surprising relationship between soluble platinum content and relative activity provides a simple and rapid method for estimating catalyst activity by merely determining soluble platinum content. Of course, for catalysts of substantially-differing compositions, methods of preparation, configuration, and the like, separate correlations are required since other factors also may affect overall activity level, e.g., pellet size. For a particular composite, however, changes in activity can be related to changes in soluble platinum content. As pointed out previously, soluble platinum content may be determined directly or computed by subtracting insoluble platinum content from total platinum content. Soluble platinum content may also be conveniently correlated with other measures of catalyst activity, in addition to the relative activity herein used.

*Examples—Series II*

Additional tests were carried out to determine whether the amount of insoluble platinum changed with duration of contact with the hydrofluoric acid. Insoluble platinum was determined in the same manner as in Examples—Series I. The catalyst, i.e., Catalyst D, was prepared in essentially the same manner as Catalyst A, above described. The following table clearly shows that essentially no change in the amount of insoluble platinum results whether the contact time is one hour or as long as 30 hours:

Catalyst D:     Weight percent insoluble platinum
- After 1 hour _____ 0.259
- After 6 hours _____ 0.268
- After 24 hours _____ 0.260
- After 30 hours _____ 0.262

The above specific examples of my invention clearly demonstrate its potential as a means of quickly determining the effects of various treats on catalyst activity of a given composite with a minimum of expense and without having to resort to actual pilot-plant testing. It is also apparent that this method of activity determination lends itself to testing a very small sample of the catalyst. While 5-gram samples were used in all of the above tests as a matter of convenience, even 1-gram samples can be tested with substantially no change in accuracy of the activity determination.

When the solution of active platinum in hydrofluoric acid is dried down and calcined to form a catalytic composite, its activity per unit of platinum is substantially higher than that of the composite from which the solution was formed. Likewise, when the solution is cogelled with or used to impregnate another support, preferably alumina, a surprisingly-active composite results.

The composite is broadly useful in hydrocarbon-conversion reactions which are catalyzed by platinum. Specifically, the catalyst is useful for reforming, isomerization, hydrogenation, hydrocracking, dehydrogenation, oxidation, polymerization, condensation, and other reactions known in the art. The required processing conditions depend upon the specific reactions and the charging stocks involved, and may readily be determined from the teachings of the prior art. In general, the improved catalyst is suitable in the same applications and under substantially the same conditions as required for conventional platinum-alumina composites. In utilizing the catalyst for the reforming of a petroleum naphtha, a feed stock consisting essentially of a virgin naphtha, a cracked naphtha, or a mixture thereof, boiling within the range of about 70 to 500° F., and preferably within the range of about 150 to 400° F., is contacted in the vapor phase with the catalytic mixture at a liquid hourly space velocity between about 0.1 and 10 and a temperature within the range of about 800 to 1050° F., the average temperature throughout the catalyst bed being maintained within the range of about 875 to 950° F., preferably around 900° F. Hydrogen is added to the reaction zone at a rate between about 1000 and 10,000 standard cubic feet per barrel of charging stock. The process is ordinarily operated at a pressure within the range of about 100 to 1200 pounds per square inch.

While I have described my invention with reference to certain specific embodiments and operating examples, it is to be understood that such embodiments and examples are illustrative only and not by way of limitation. Numerous additional embodiments of the invention and alternative manipulative techniques and operating conditions will be apparent from the foregoing description to those skilled in the art.

In accordance with the foregoing description, I claim as my invention:

1. A method for determining hydrocarbon conversion activity of a halogen-containing platinum-alumina composite which comprises contacting said composite with an excess of hydrofluoric acid containing at least about 5 weight percent hydrogen fluoride for a time sufficient to dissolve substantially all of the alumina in said composite, whereby the amount of platinum in the resulting solution of alumina in hydrofluoric acid provides a measure of said activity.

2. The method of claim 1 wherein said hydrofluoric acid contains between about 30 and 60 percent by weight of hydrogen fluoride.

3. The method of claim 1 including the additional steps of impregnating an alumina support with said resulting solution of alumina in hydrofluoric acid and drying and calcining the resulting impregnated support.

4. A method for determining the reforming activity of a platinum-halogen-alumina catalyst which comprises contacting said catalyst with dilute hydrofluoric acid containing at least about 5 weight percent hydrogen fluoride for a time sufficient for the alumina to be substantially completely reacted with said hydrofluoric acid so as to form a solution therewith; and determining the platinum content of said solution, whereby the amount of platinum in said solution provides a measure of activity.

5. A method for determining the active platinum content of a platinum-halogen-alumina catalytic composite which comprises pre-wetting said composite; adding an excess of dilute hydrofluoric acid containing at least about 5 weight percent hydrogen fluoride to the pre-wetted composite for a time sufficient to bring substantially completely all alumina into solution therewith; and measuring the platinum dissolved in said solution, whereby the amount of dissolved platinum provides an indication of said active platinum content.

6. The method of claim 5 including the step, prior to pre-wetting, of finely dividing said composite so as to pass at least about a 20 mesh ASTM sieve.

7. A method for determining reforming activity of a platinum-halogen-alumina composite which comprises measuring the total platinum content of said composite; contacting said composite with an excess of hydrofluoric acid containing at least about 5 weight percent hydrogen fluoride for a time sufficient for hydrofluoric-acid-soluble components to be substantially completely dissolved therein; separating the resulting solution from the resulting residue; and measuring the platinum content of said residue, whereby the difference between said total platinum content and said platinum content of said residue provides a measure of the activity.

8. A method for determining the active platinum and inactive platinum contents of platinum-halogen-alumina composites which comprises pre-wetting the finely-divided composite with 0.5 to 20 milliliters of water per gram of pre-wetted composite; commingling the composite with an excess of dilute hydrofluoric acid containing at least about 5 weight percent hydrogen fluoride for about one minute to one hour, whereby hydrofluoric-acid-soluble components of the composite are dissolved therein; separating the resulting solution from the resulting residue; and determining the amounts of platinum in said solution and in said residue whereby the amount of platinum in said solution provides a measure of active platinum and the amount of platinum in said residue provides a measure of inactive platinum.

References Cited in the file of this patent

UNITED STATES PATENTS

| | | |
|---|---|---|
| 2,381,562 | Stewart | Aug. 7, 1945 |
| 2,479,109 | Haensel | Aug. 16, 1949 |

UNITED STATES PATENT OFFICE
CERTIFICATE OF CORRECTION

Patent No. 2,928,792                           March 15, 1960

Ralph J. Bertolacini

It is hereby certified that error appears in the printed specification of the above numbered patent requiring correction and that the said Letters Patent should read as corrected below.

Column 7, line 16, strike out "pre-wetted" and insert the same after "the" in same line 16, same column 7.

Signed and sealed this 13th day of September 1960.

(SEAL)
Attest:
KARL H. AXLINE
Attesting Officer

ROBERT C. WATSON
Commissioner of Patents